United States Patent [19]
Deal

[11] Patent Number: 4,951,457
[45] Date of Patent: Aug. 28, 1990

[54] NARROW PITCH ARTICULATED CHAIN AND LINKS THEREFOR

[76] Inventor: Douglas O. Deal, 9707 Straightaway La., Bahama, N.C. 27503

[21] Appl. No.: 433,517

[22] Filed: Nov. 8, 1989

[51] Int. Cl.⁵ .............................................. F16G 13/06
[52] U.S. Cl. ......................................... 59/78; 59/900; 198/850
[58] Field of Search ....................... 59/78, 78.1, 80, 84, 59/85, 900, 4, 5; 198/850, 851, 852; 474/214, 215, 226

[56] References Cited

U.S. PATENT DOCUMENTS

| | | |
|---|---|---|
| 361,616 | 4/1887 | Cornog. |
| 1,529,243 | 3/1925 | Drake et al. ........................ 198/851 |
| 1,551,764 | 9/1925 | Muller. |
| 2,143,593 | 1/1939 | Bryant ................................ 198/851 |
| 2,693,268 | 11/1954 | Ball .................................... 198/851 |
| 2,954,113 | 9/1960 | Hibbard et al. ..................... 198/851 |
| 2,986,387 | 5/1961 | Illing .................................. 198/851 |
| 3,046,806 | 7/1962 | Collins ................................. 74/245 |
| 3,584,922 | 6/1971 | Koerner .............................. 305/36 |
| 3,680,927 | 8/1972 | Neureuther ........................ 198/850 |
| 3,759,035 | 9/1973 | Schmidberger ..................... 59/78.1 |
| 3,921,792 | 11/1975 | Anderson ........................... 198/851 |
| 4,276,040 | 6/1981 | Petershack ........................ 474/229 |
| 4,463,550 | 8/1984 | Avramidis .......................... 59/84 |
| 4,490,970 | 1/1985 | Curl .................................... 59/79.1 |
| 4,570,437 | 2/1986 | Moritz ................................ 59/78.1 |
| 4,579,219 | 4/1986 | Burkhardt .......................... 198/845 |
| 4,758,209 | 7/1988 | Ledvina .............................. 474/156 |
| 4,758,210 | 7/1988 | Ledvina .............................. 474/212 |
| 4,813,224 | 3/1989 | Blase .................................. 59/78.1 |

FOREIGN PATENT DOCUMENTS 0286442 10/1988 European Pat. Off. ............... 59/84

Primary Examiner—David Jones
Attorney, Agent, or Firm—Richard E. Jenkins

[57] ABSTRACT

A narrow pitch articulated chain wherein the chain links have a narrow pitch and include a concave bearing surface in the bottom thereof in order to travel around a small diameter nose bar and effect an end transfer of small items from a flat top product transport chain. The pitch of the chain links is 0.625 inches or less, and the radius of the bearing surface and nose bar are both 0.5 inches or less and substantially equal to each other.

4 Claims, 2 Drawing Sheets

NARROW PITCH ARTICULATED CHAIN AND LINKS THEREFOR

TECHNICAL FIELD

The present invention relates to articulated chains for transporting selected items on the top surface thereof, and more particularly to an improved narrow pitch articulated chain and links therefor.

BACKGROUND ART

Conventional small pitch chains have been used for many years in various applications For example, U.S. Pat. Nos. 4,813,224 to Blase and 4,570,437 to Moritz disclose small pitch conveyor chains which are used in energy conductor applications such as, for example, guiding energy conduits (cables or hoses) from a fixed attachment point to a moveable consuming load. U S. Pat. Nos. 4,758,209 and 4,758,210 to Ledvina, U.S. Pat. No. 4,463,550 to Avramidis, U.S. Pat. No. 3,046,806 to Collins, and U.S. Pat. No. 1,551,764 to Muller all generally disclose power transmission chains which are not used for material handling purposes such as the chain of the present invention. Also of interest, U.S. Pat. Nos. 4,579,219 to Burkhardt, 4,490,970 to Cure, and 3,759,035 to Schmidberger disclose various chain configurations for conveying product, but none have the performance capability of the narrow pitch articulated chain and links therefor of the present invention for transporting and transferring small products.

Thus, it is evident from the prior art that others have attempted to provide a conveyor chain capable of facilitating the easy transfer of items being carried thereby (such as cans, cartons, bottles, jars and the like in suitable packaging containers, as well as unpackaged products such as crackers, cookies, and cakes) by using links with relatively small pitch diameters and providing for the products carried by the chain to be end-transferred off the chain. However, until the narrow pitch articulated chain and links therefor of the present invention, it was not feasible to transfer the product being transported by a conveyor chain across a small diameter nose bar other than by using a fabric or flexible type conveyor belt.

DISCLOSURE OF THE INVENTION

In accordance with the present invention, applicant provides a narrow pitch articulated chain for conveying selected items on the top surface thereof and which is adapted to travel around a small diameter nose bar in an endless loop. The chain comprises a plurality of plastic chain links with means for pivotally connecting said links to one another, and each of the chain links comprises an elongate body member with a substantially planer top surface and a plurality of spaced-apart apertures positioned in the lengthwise direction on opposing sides of said body member so as to define first and second pivotal axes at the front and rear, respectively, of the chain link which extend parallel to the longitudinal axis thereof. The first and second pivotal axes of the chain link are spaced-apart about 0.625 inches or less, and the chain link further includes a concave portion in the medial section of the bottom surface thereof between the first and second pivotal axes which defines a radius of 0.5 inches or less so as to facilitate travel around a small diameter nose bar. Most suitably, the nose bar has a radius of 0.5 inches or less and equal to the radius defined by the concave portion of the chain link Accordingly, it is an object of the present invention to provide an improved narrow pitch articulated chain and links therefor for transporting product thereon which is capable of transferring the product carried thereby across a small diameter nose bar and to thus effect an end-transfer of small items from a flat top type plastic conveyor chain.

BRIEF DESCRIPTION OF THE DRAWINGS

Some of the objects of the invention having been stated, other objects will become evident as the description proceeds, when taken in connection with the accompanying drawings, in which.

BEST MODE FOR CARRYING OUT THE INVENTION

Figure 1:
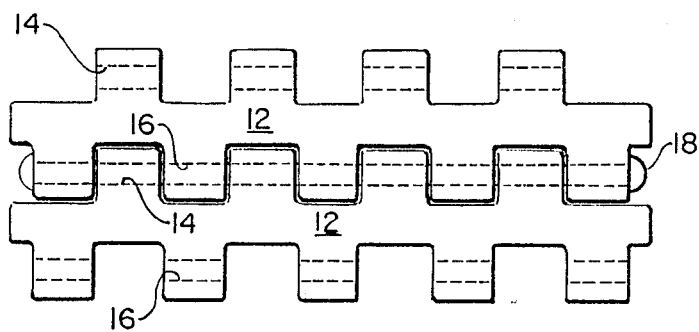
FIG. 1 shows a top plan view of the chain link of the present invention.
Figure 2:
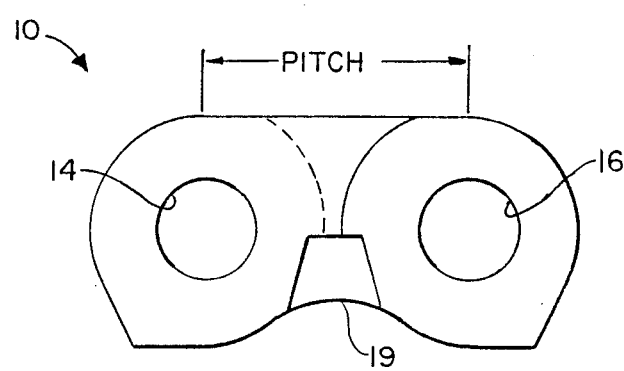
FIG. 2 shows a side elevation of the chain link of the present invention.
Figure 3:
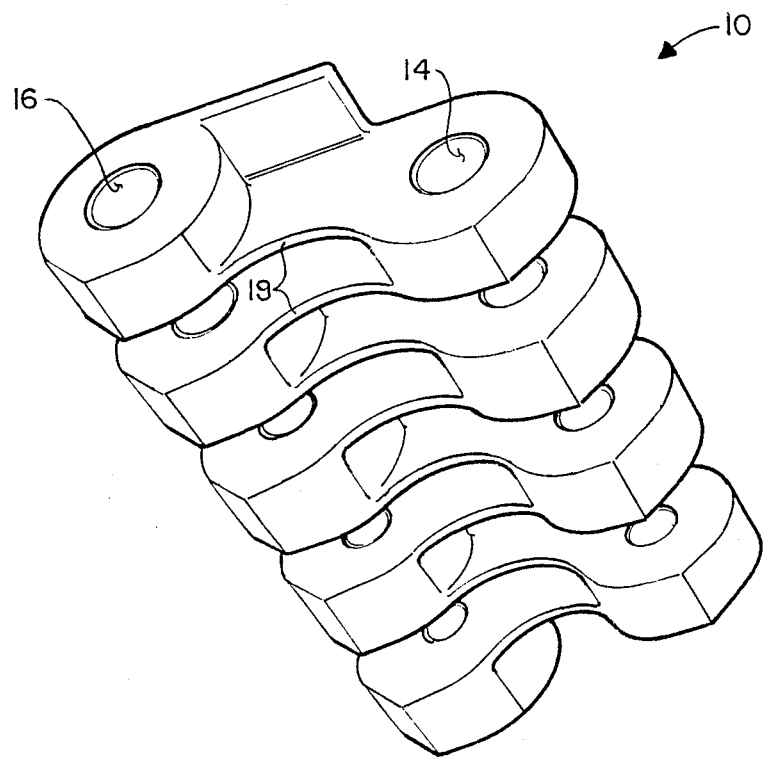
FIG. 3 shows a bottom perspective view of the chain link of the present invention.
Figure 4:
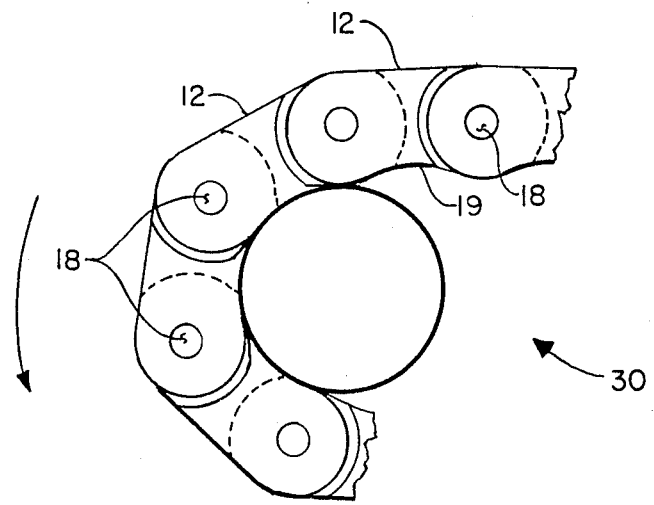
FIG. 4 shows the chain of the present invention travelling around a small diameter nose bar in order to effect an end transfer of product (not shown) carried by the chain.

Referring now more particularly to the disclosure in FIGS. 1-4 of the drawings wherein it is shown an illustrative preferred embodiment of the present invention, FIGS. 1, 2 and 3 disclose a narrow pitch plastic chain link 10 in accordance with the present invention, and FIG. 4 shows the narrow pitch articulated chain 20 travelling around a small diameter nose bar 30 in a fashion which would effect an end transfer of items being transported (not shown) on product convey chain 20. It should be appreciated that whenever the term "nose bar" is used hereinafter, it refers to either a small diameter "nose roller" or a small diameter "nose bar" around which the narrow pitch articulated chain of the invention travels in order to effect a transfer of product from the end of the chain onto an adjacent stationary platform or moving conveyor. The narrow pitch articulated chain of the invention is intended for use in applications where it is desirable to provide an end transfer by movement of a plastic flat top chain around a small diameter nose bar. This is particularly desirable when transporting cans, cartons, bottles, jars and the like in packaging containers, as well as unpackaged products such as crackers, cookies, cakes, small parts and the like on the top surface of the articulated chain. Most suitably, the chain is driven by a conventional tooth and sprocket drive although other drive means are contemplated by the novel chain and links therefor of the present invention.

It is well understood in the art of conveying products with a moving endless chain that there are times when the objects carried by the conveyor chain are required to be transferred onto an adjoining stationary or moving section of the transfer system by a means known as an "end transfer". As is also known by those skilled in the art, the ease of end transfer of product being carried by a flat top type conveyor chain is directly related to the radius of the chain support at the transfer point to the footprint of the product being transferred. In other words, the smaller the radius of the chain support (nose bar or nose roller), the smaller the footprint of the product that can be transferred across the end transfer without disturbing the orientation or stability of the product. Applicant's novel narrow pitch articulated chain and links therefor provide for the use of a smaller diameter nose bar in conjunction with an articulated flat top type chain than has heretofore been possible, and consequently renders it possible to transfer smaller products than previously thought feasible. This is accomplished by the unique features of applicant's chain link 10 and the unique narrow pitch articulated chain 20 constructed from a plurality of links 10.

As best seen in FIGS. 1 and 2, applicant's link 10 includes a top surface 12 and a plurality of apertures 14 and 16, respectively, provided in the leading and trailing edges of chain link 10. The spaced-apart apertures 14 and the spaced-apart apertures 16 serve to define first and second pivotal axes at the front and rear, respectively, of chain link 10. A conventional pivot pin 18 (see FIG. 4) extends through apertures 14 at the leading edge of chain link 10, and another pivot pin 18 extends through aperture 16 at the trailing edge of chain link 10 in order to pivotably connect chain link 10 to adjacent similar chain links which form endless narrow pitch articulated chain 20.

With reference now to FIG. 3 of the drawings, it can be further appreciated that chain link 10 has a concave portion 19 in the medial section of the bottom surface which serves as a bearing surface as chain link 10 travels around nose bar 30 (see FIG. 4).

The novelty of applicant's invention is the combination of features comprising a narrow pitch link 10 wherein the pitch is 0.625 inches or less and the concave bottom bearing surface 19 of chain link 10 which in combination allow for movement of articulated chain 20 around a very small diameter nose bar 30. More specifically, nose bar 30 has a radius of no more than 0.5 inches, and the radius defined by bottom bearing portion 19 of chain link 10 also defines a radius of no greater than 0.5 inches. Most suitably, the radius of nose bar 30 and concave bearing portion 19 of chain link 10 are of the same size. Applicant believes that the small pitch of chain link 10 in combination with concave bearing portion 19 in the bottom surface of chain link 10 results in the unexpected and surprisingly superior capability to effect end transfer from a flat top chain for product having a relatively small diameter foot print. This allows for new applications for articulated chain 20 which have not heretofore been possible and which could only be addressed by a fabric belt conveyor which in many cases resulted in unsatisfactory performance.

The critical dimensions of several representative chain links made in accordance with the present invention are set forth below but are intended only to be as representative of the many embodiments possible of articulated chains and links therefor which can be made in accordance with applicant's invention.

EXAMPLE 1

0.50 Inch Pitch Link
0.50 Inch Concave Radius

EXAMPLE 2

0.38 Inch Pitch Link
0.25 Inch Concave Radius

EXAMPLE 3

0.62 Inch Pitch Link
0.38 Inch Concave Radius

It will be understood that various details of the invention may be changed without departing from the scope of the invention. Furthermore, the foregoing description is for the purpose of illustration only, and not for the purpose of limitation—the invention being defined by the claims.

What is claimed is:

1. In combination a narrow pitch articulated chain for conveying selected items on the top surface thereof and adapted to travel in an endless loop, said chain comprising a plurality of plastic chain links with means for pivotally connecting said links to one another wherein each of said chain links comprises a body member having a greater width than length and a plurality of spaced-apart apertures extending in the widthwise direction or said body member so as to define first and second pivotal axes at the front and rear thereof, and further wherein said first and second pivotal axes of said chain links are spaced-apart about 0.625 inches or less and said chain links each define a concave portion in the bottom surface thereof between said first and second pivotal axes and having a radius of 0.5 inches or less; and a nose bar having a radius substantially equal to the radius defined by the concave portion of said chain links.

2. A chain according to claim 1 wherein said chain is driven by a tooth and sprocket drive.

3. A chain according to claim 1 wherein said nose bar is a fixed shaft.

4. A chain according to claim 1 wherein said nose bar is a rotatable roller.

* * * * *